Dec. 10, 1957 S. RUBEN 2,816,151
POTENTIAL PRODUCING CELL
Filed Oct. 5, 1954

INVENTOR
Samuel Ruben
BY
ATTORNEY

United States Patent Office 2,816,151
Patented Dec. 10, 1957

2,816,151
POTENTIAL PRODUCING CELL

Samuel Ruben, New Rochelle, N. Y.

Application October 5, 1954, Serial No. 460,389

13 Claims. (Cl. 136—83)

This invention relates to potential producing cells and to high voltage dry batteries constructed with said cells.

It is an object of the invention to improve potential producing cells.

It is another object of the invention to provide a potential producing cell capable of holding its potential over long periods of time.

It is a further object of the invention to provide a dry cell containing no aqueous electrolyte which may be conveniently assembled into a high voltage dry battery operable over wide temperature limits with minimum change in characteristics.

The invention also contemplates the provision of a non-aqueous high voltage dry battery which is simple in structure, is characterized by an extremely long useful life and which may be readily manufactured on a quantity production scale at a low cost.

Figure 1:
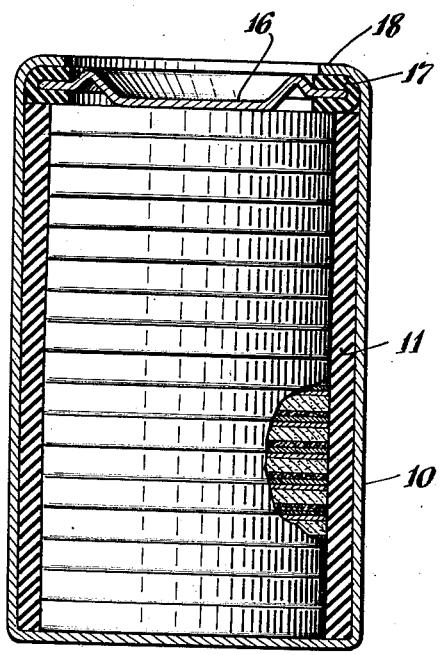
Figure 2:
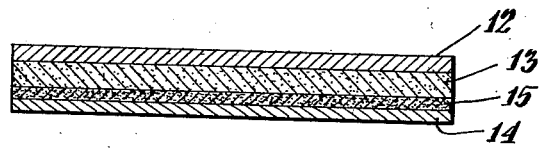

Other and further objects and advantages of the present invention will become apparent from the following description, taken in conjunction with the accompanying drawing, in which:

Fig. 1 is a vertical sectional view, having parts in elevation, of a high voltage dry battery embodying the invention; and Fig. 2 is a sectional view of a single cell forming part of the battery shown in Fig. 1.

The present application is a continuation-in-part of my co-pending application Serial No. 402,013, filed January 4, 1954, now Patent No. 2,707,199, dated April 26, 1955.

Broadly stated, the invention comprises a non-aqueous dry cell comprising a solid ionic conductor of a hydrolizable sulfate, such as bismuth sulfate, $Bi_2(SO_4)_3$ or antimony sulfate, $Sb_2(SO_4)_3$.

I have found that discs compressed from bismuth or antimony sulfate are ionically conductive and when placed in contact with dissimilar materials they will generate a potential depending on the electrochemical difference in the materials and will maintain their potential under various conditions of shelf life. Essentially the invention contemplates a cell capable of holding a constant potential at open circuit condition and one suitable for applications where only extremely low currents are required.

Bismuth sulfate and antimony sulfate, being solid and ionically conductive, do not depend upon nor do they require the addition of any moisture, humectants or other agents.

In a practical form of the invention, the cell components may be Inconel (a nickel-chromium alloy containing minor percentages of copper, silicon, manganese and carbon) as the negative terminal, bismuth sulfate or antimony sulfate as the dry, solid, ionic conductor, and lead peroxide as the positive terminal, the bismuth or antimony sulfate being the middle member. This combination provides a potential of approximately 1.5 volts. As most of the potential is generated at the interface of the sulfate and the lead peroxide surfaces, carbon or graphite can be used as the negative electrode where a lower voltage (1.0 volt) is useful in combination with higher stability.

In addition to Inconel and carbon or graphite, the following materials are useful as negative terminals or electrodes: nickel and nickel alloys other than Inconel, stainless steel, chromium, antimony, tin, lead, aluminum. Materials useful as positive terminals or electrodes are electronegative depolarizer compounds, such as, in addition to lead peroxide, the oxides of lead, manganese, vanadium, and their mixtures with graphite and the permanganates of barium, potassium, silver and copper, preferably in admixture with graphite.

In the manufacture of cell components for a typical high voltage battery assembly, the bismuth or antimony sulfate is compressed at 10 tons per square inch into 1 inch discs about ⅛ inch thick, then crushed, granulated and pressed at a pressure of 6 tons per square inch into ½ inch diameter pellets. The positive terminal may be made by electrodepositing lead peroxide from a lead nitrate solution onto a 5 mil thick Inconel strip, the lead peroxide being deposited on the strip as a solid, integral layer. Discs can be readily punched from this strip of the same diameter as the bismuth or antimony sulfate pellet. One side of the Inconel is masked so that the deposition occurs only on one side. Alternatively, the positive electrode may be made by granulating to 40-mesh size a precompressed mixture of electrolytically produced lead peroxide and 0.5% of gum arabic. The gum assists in binding the lead peroxide particles, the mixture being compressed at 6 tons pressure to produce discs of ½ inch diameter. 500 milligrams of the lead peroxide mixture produce a ½ inch disc of about 30 mils thickness. The discs are baked at 100° C. before use to eliminate any moisture. Other binding agents, such as paraffin, styrene, polyvinyl, etc., may be used in place of the gum arabic and in the same proportion.

Both bismuth sulfate and antimony sulfate are hygroscopic and for this reason must be used under controlled conditions. Thus, in order to maintain maximum shelf life, particularly at elevated temperatures, it is necessary to reduce any absorption of moisture from the atmosphere to a minimum. This is facilitated by admixing 2% by weight of silicone in a volatile suspension with the bismuth or antimony sulfate and by vacuum drying the mixture. The discs of bismuth or antimony sulfate, prior to being used, are stored in an oven and the battery unit, when assembled, is vacuum dried or oven heated to eliminate free moisture which could cause conductive paths along the walls of the container or reactions between the elements. Also, it is desirable to provide a hermetically sealed container for the battery unit which may be evacuated prior to final sealing. The units must be assembled in a controlled atmosphere to prevent excessive absorption of moisture.

Figure 2 of the drawing illustrates a single cell assembly in which one side of the bismuth or antimony sulfate electrode 13 is in contact with the Inconel negative electrode 12. The positive electrode comprises Inconel base 14, having a coating of lead peroxide, the coating contacting the bismuth or antimony sulfate conductor.

Figure 1 illustrates an assembly of the cells described in Figure 2 into a high voltage battery in which the outer casing 10, comprising nickel-plated steel, has a styrene tube 11 lining the inside wall. The cells are stacked in the tube in the order of Inconel, bismuth or antimony sulfate and lead peroxide, a sufficient number of cells being employed to provide the desired voltage. The top terminal 16 of the battery is insulated from the container 10 by a polyethylene grommet 17. The battery is sealed and pressure applied to the cells by crimping the steel container at 18 against the polyethylene grommet. It will be noted that the outer casing of nickel-plated steel serves as one terminal and that the top closure of the battery serves as the other terminal. For some structures, a compression element, such as a spring, may be added to insure continuous pressure on the stack under all conditions.

Where higher discharge currents are desirable, which would necessarily require large areas, roll type structures may be employed, utilizing lead peoxide coated Inconel and uncoated Inconel foils, separated by paper impregnated with bismuth or antimony sulfate.

I claim:

1. A potential producing dry cell having a solid electrolyte essentially composed of a material selected from the group consisting of bismuth sulfate and antimony sulfate, and cooperating electrodes in contact therewith, said electrodes being constituted by such materials as to develop a potential difference therebetween.

2. A potential producing dry cell having a solid electrolyte essentially composed of bismuth sulfate, and cooperating electrodes in contact therewith, said electrodes being constituted by such materials as to develop a potential difference therebetween.

3. A potential producing dry cell having a solid electrolyte essentially composed of antimony sulfate, and cooperating electrodes in contact therewith, said electrodes being constituted by such materials as to develop a potential difference therebetween.

4. A potential producing dry cell having a solid ionic conductor essentially composed of a material selected from the group consisting of bismuth sulfate and antimony sulfate, and cooperating positive and negative electrodes in contact with said ionic conductor and constituted by such materials as to develop a potential difference therebetween, said positive eletcrode being in the form of compressed particles having a relatively small amount of binder admixed therewith.

5. A potential producing cell comprising a solid ionic conductor essentially composed of a material selected from the group consisting of bismuth sulfate and antimony sulfate, and cooperating electrodes in contact therewith constituted by such materials as to develop a potential difference therebetween, one of said electrodes having a carbon surface.

6. A potential producing cell having a solid ionic conductor essentially composed of a material selected from the group consisting of bismuth sulfate and antimony sulfate, and cooperating electrodes in contact therewith constituted by such materials as to develop a potential difference therebetween, one of said electrodes having a surface of lead peroxide.

7. A potential producing cell comprising a solid ionic conductor and two electrodes in juxtaposition, the middle element being essentially composed of a material selected from the group consisting of bismuth sulfate and antimony sulfate as the solid ionic conductor, the surfaces of the two electrodes in contact with the selected sulfate being composed of a nickel alloy and lead peroxide respectively.

8. A potential producing cell having a solid ionic conductor essentially composed of a material selected from the group consisting of bismuth sulfate and antimony sulfate, a contacting metal electrode on one side thereof, and a contacting conductive depolarizer electrode on the other side thereof, said electrodes being constituted by such materials as to develop a potential difference therebetween.

9. A potential producing cell having a negative electrode comprising one of the metals selected from the group consisting of nickel, chromium, antimony, tin, lead, aluminum and alloys thereof, a positive electrode comprising an electronegative depolarizer compound, and a non-aqueous solid electrolyte consisting substantially of a material selected from the group consisting of bismuth sulfate and antimony sulfate, said negative and positive electrodes being adapted to develop a potential difference therebetween when in contact with said solid electrolyte.

10. A potential producing cell having a negative electrode, a positive electrode comprising an electro-negative depolarizer compound selected from the group consisting of the oxides of lead, manganese and vanadium, and a non-aqueous solid electrolyte consisting substantially of a material selected from the group consisting of bismuth sulfate and antimony sulfate, said negative and positive electrodes being adapted to develop a potential difference therebetween when in contact with said solid electrolyte.

11. A potential producing cell having a negative electrode, a positive electrode comprising an electro-negative depolarizer compound selected from the group consisting of the permanganates of barium, potassium, silver and copper and from mixtures of such permanganates with graphite, and a nonaqueous solid electrolyte consisting substantially of a material selected from the group consisting of bismuth sulfate and antimony sulfate, said negative and positive electrodes being adapted to develop a potential difference therebetween when in contact with said solid electrolyte.

12. A dry battery comprising a series of stacked cells under pressure, each of said cells comprising a negative electrode of nickel alloy, a positive electrode of lead peroxide, and a solid non-aqueous electrolyte essentially composed of a material selected from the group consisting of bismuth sulfate and antimony sulfate.

13. A dry battery comprising an outer casing; a series of stacked cells under pressure in said casing; each of said cells comprising a negative electrode, a positive electrode, and a solid, non-aqueous electrolyte essentially composed of an inorganic hydrolizable sulfate, said negative and positive electrodes being adapted to develop a potential difference therebetween when in contact with said solid electrolyte; said casing being hermetically sealed and substantially evacuated.

References Cited in the file of this patent

UNITED STATES PATENTS

| | | |
|---|---|---|
| 1,944,065 | Chamberlain | Jan. 16, 1934 |
| 2,696,513 | Lehovec | Dec. 7, 1954 |
| 2,707,199 | Ruben | Apr. 26, 1955 |